LOAD SUPPORTING STRUCTURES

Original Filed Feb. 4, 1966 2 Sheets-Sheet 1

INVENTORS
EDWARD T. GETZ
MATTHEW PACAK

BY Teague, Sadler & Todd

ATTORNEYS

LOAD SUPPORTING STRUCTURES

Original Filed Feb. 4, 1966 2 Sheets-Sheet 2

INVENTORS
EDWARD T. GETZ
MATTHEW PACAK

BY Teagno, Sesler & Teddy

ATTORNEYS

United States Patent Office

Re. 26,946
Reissued Sept. 8, 1970

26,946
LOAD SUPPORTING STRUCTURES

Edward T. Getz, Cleveland Heights, and Matthew Pacak, Solon, Ohio, assignors to Eaton Yale & Towne Inc., Cleveland, Ohio, a corporation of Ohio Original No. 3,329,466, dated July 4, 1967, Ser. No. 525,037, Feb. 4, 1966. Application for reissue Feb. 4, 1969, Ser. No. 813,774
Int. Cl. A47c *27/14, 27/22*
U.S. Cl. 297—458 23 Claims

Matter enclosed in heavy brackets [ ] appears in the original patent but forms no part of this reissue specification; matter printed in italics indicates the additions made by reissue.

This invention relates to load supporting structures adaptable for use in vehicle seats, furniture, crash pads, etc., or other cushion devices of this general nature. More specifically, this invention is directed to a new and novel combination of frame members, load supporting and transferring structure and resilient material to provide a novel cooperation of these elements in a combined form to result in a new and improved load supporting construction.

In the prior art, cushion or seat constructions used as load supporting members of this general type do not take maximum advantage of the combination of the supporting members and resilient material making up such cushion or seat. Such devices, for example, contain flexible members embedded in the resilient materials such as foam, the flexible members being attached to a frame which is adapted to be carried, for example, in the case of furniture, on the furniture legs, or in the case of vehicle seats, on members protruding from the floor of the vehicle. In these types of seat constructions the foam material does not surround the frame and does not fully cooperate with the under or lower surfaces of the flexible members to provide the greatest utility to the combination of the elements making up the construction.

It is an object of this invention to provide a load supporting structure having a novel arrangement of frame means with an attached bolster support means, load transfer means mounted on the bolster support means and resilient material bonded or adhered to at least the lower surfaces or underside of the load transfer means so that loads applied to the structure are proportionately transferred to the frame means by the load transfer means, bolster support means, and the resilient material.

It is a further object of this invention to provide a load supporting structure having a bolster frame attached to and movable towards a sub-frame upon application of load with a load supporting and transferring structure carried on the bolster frame and resilient material bonded to and surrounding the sub-frame and the bolster frame and bonded to at least the underside of said load transfer means so that load applied to the load supporting structure is proportionately transferred to the sub-frame by the load supporting transferring structure, the bolster frame and the resilient material.

Yet another object of this invention is provision of a load supporting structure as noted in a next preceding paragraph wherein the load supporting and transferring structure is supported solely at one end or in cantilevered fashion to said bolster frame means and extends longitudinally toward the opposite end of the bolster frame means.

It is a further object of this invention to provide a load supporting structure having frame means including a sub-frame and a bolster frame which is connected near one end to the sub-frame and is inclined upwardly so that a major portion of the bolster frame is spaced from said sub-frame in a direction toward the load contacting surface of the structure with the major portion of the bolster frame disposed outwardly of the corresponding portion of the sub-frame, to provide lateral supporting capabilities to the structure.

Another important object of this invention is to provide a seat which has a high degree of what is termed "feel" or "softness" at both the front and rear edges of the load supporting structure in addition to the main or common loading center area of the load supporting structure by a "floating" type of mounting arrangement of a bolster wire support means which is supported at one end by underlying bonded resilient material and which end carries load supporting and transferring structure.

Still further objects of this invention will become apparent upon a reading of the following detailed description of this invention and annexed drawings in which.

Before explaining the present invention in detail it is to be understood that the invention is not limited in its application to the particular construction and arrangement of parts illustrated in the accompanying drawings, since the invention is capable of other embodiments and of being practiced and carried out in various ways. Also, it is to be understood that the phraseology or terminology employed herein is for the purpose of description and not of limitation.

Figure 1:
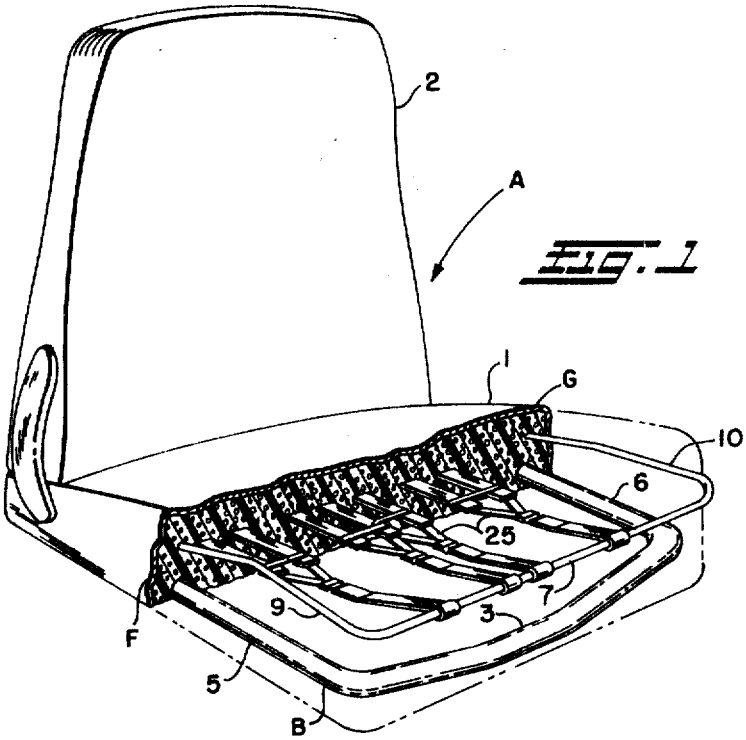
FIGURE 1 is a perspective view of one load supporting embodiment of this invention in the form of a seat showing the base portion of the seat with parts broken away to illustrate the internal construction of the seat.

Referring to the drawings, FIGURE 1 discloses an illustration of one load supporting embodiment of this invention for a new and novel seat construction and particularly of a bucket-type seat for use in vehicles. It will be obvious that the invention is applicable to other vehicular seat constructions and to household furniture such as, davenports, couches, chairs and the like. The seat construction shown in FIGURE 1 and generally indicated by letter A comprises a base portion 1 and a back portion 2 for supporting the buttocks and back of the vehicle passenger respectively. FIGURE 1 illustrates the relationship of the support members B and C, to be described, and flexible load supporting and transferring apparatus D, resilient material F and cover or upholstery G making up the overall combination of the load supporting construciton. FIGURES 2 through 5 illustrate one form of construction of the supporting means and cooperating load supporting and transferring structure of this invention. A base support or frame generally indicated at B is formed for strength and rigidity of tubular stock or other suitable material shaped to provide a front support section 3, a rear support section 4, and side sections 5 and 6. Mounting "feet" members integrally connected to the base frame could be provided so that the entire seat construction might be attached to a suitable pair of guide rails on which the seat is to be mounted to provide for adjustment of the seat. Near the rear of the side sections 4 and 5 of base support means B, a longitudinally extending bolster wire secondary support means generally indicated as C is clamped or otherwise suitably fixed by means E to the base support means B to provide a suitable support for the load transfer and supporting structure generally indicated at D which will presently be described. It is to be understood that the bolster wire support means C could be fixed to the base or frame support means B by welding, press-fit engagement, or other such arrangements. It is also to be understood that the base or frame support means B could be made of angle iron, stamped stock or of other different construction. The bolster wire support means C is formed of stock spring steel wire or other suitable material shaped to provide a front support section 7, a rear support section 8, and side sections 9 and 10 which have angled portions 9a and 10a as shown. By means of the divergent portions 9a and 10a the major portion of the side section of the wire support means C is offset laterally from the side sections 5 and 6 of the base or main support means B. This offset structure of the bolster wire support means is for the purpose of providing the particular contour of and a bolstering or supporting action to the sides of the finished cushion unit. The bolster wire support means is mounted on the base or frame means B by means of the illustrated clamping means E so that the wire support means C extends longitudinally in an upwardly inclining plane away from the plane of the base support means B. The front section 7 and a major portion of the side sections 9 and 10 of the wire support means C is vertically offset from the base support means B towards the loading surface of the structure. The rear support section 8 of the wire support means C is longitudinally offset from the rear section of base support means B. This particular inclined mounting arrangement of the wire support means C is critical to the invention because it permits the front section 7 and the rear section 8 to pivot or rotate about the attaching means E. The importance of this ability of the secondary wire support means C to move in a pivotal movement about attaching means E will presently be more fully disclosed.

Figure 2:
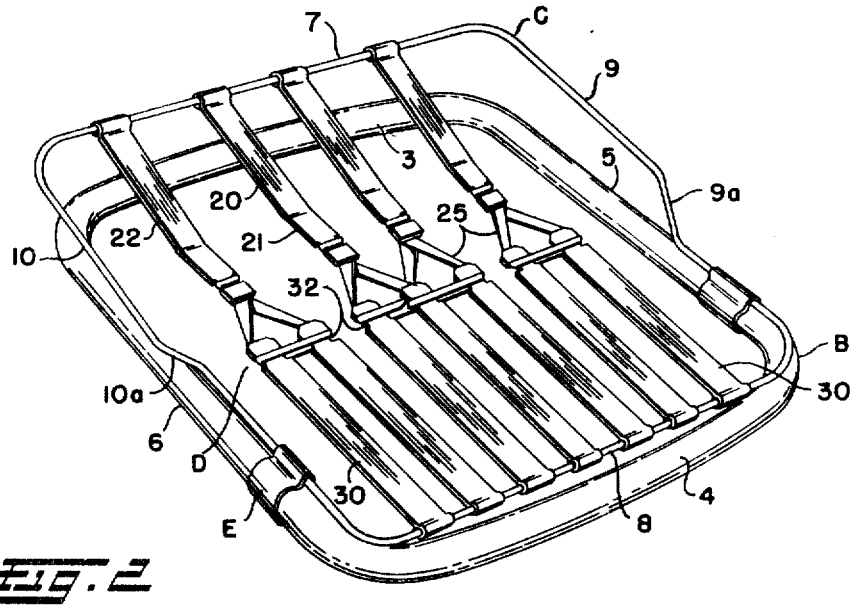
FIGURE 2 is a perspective view of the base portion of the load supporting structure shown in FIGURE 1 with parts broken away.
Figure 3:
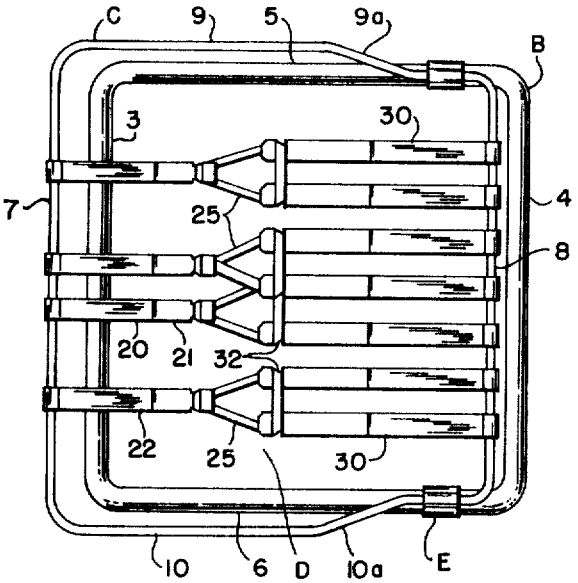
FIGURE 3 is a plan view of the load supporting structure illustrated in FIGURE 2.
Figure 4:
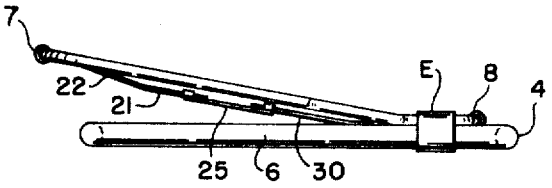
FIGURE 4 is a side elevation view of FIGURE 3.
Figure 5:
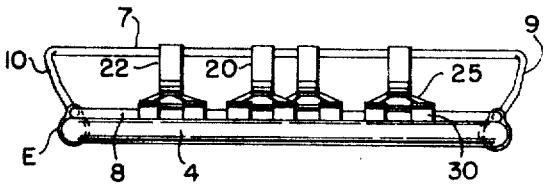
FIGURE 5 is a rear elevation view of FIGURE 3.

The load supporting and transferring structure generally refered to as D and clearly illustrated in FIGURES 2 and 3 comprises a plurality of flexible flat members having a base portion secured, attached or otherwise carried in cantilevered relationship on the front and rear sections of the wire support means C. These flexible load supporting and transferring members illustrated comprise a plurality of elongated finger-like elements which extend or project into the area of the load supporting structure of the greatest load. In the seat illustrated, the area of greatest load in the base portion 1 is located between the rear support section 4 and the transfer centerline of the seat. The fingers 20 and 30 in the illustrated embodiment of the invention are about 1 inch wide and spaced about 1 inch apart. Referring to FIGURE 4, for example, a portion 21 of the fingers 20 is offset by means of inclined portion 22 from the plane of the wire support means C in a direction away from the top surface of the seat. Thus, a portion of each of the fingers mounted on the front support section 7 of the wire support means C lays in a plane offset downwardly from the upper edge of the wire support means C. The offset arrangement of the fingers 20 prevents or alleviates fatigue failures of the fingers at the edge of the front support section 7 and the detrimental formation of a permanent set in the fingers and the foam rubber above the fingers upon cyclic loading of the unit. Opposite each of the load supporting and transferring fingers extending from the front support section 7 of the wire support means C are a pair of similar load supporting and transferring fingers similarly mounted on the rear section 8 of the wire support means C. The rear finger members 30 extend from the rear section 8 in substantially the same plane as the wire support means C and portion 21 of the opposing fingers 20.

The resilient material F is a foam rubber, preferably polyurethane foam or other similar elastomeric or rubber-like foamed material bonded or secured to at least the underside or bottom surface of the load transferring fingers 20 and 30 and is bonded or secured to support means B and C. The seat assemblies of this invention can be practiced with polyurethane foams such as polyether using the one-shot method but may also be ued in conjunction with a polyurethane prepolymer. Preferably, the foam material F completely surrounds the base support means B. The resilient material F extends between the support members 3 and 4 and functions in cooperation with the support means B and C as an independent supporting means within the structure. As shown in FIGURE 1, the resilient material as mentioned, preferably surrounds and is bonded to the base support means B in its entirety and extends between the end support members 3 and 4, so upon application of loads of the type in the vehicle seat environment, the resilient material will remain fast to the suport members and transfer such load to the base support means B. The resilient material is adhered or bonded to at least the lower surface or underside of the finger-like elements 20 and 30 and the bolster wire support means C. By bonding or adhering the resilient material to the lower surface area of the fingers, such material beneath the fingers is placed in tension upon an application of a load to the cushion structure. Thus, full advantage is taken of the cooperation between the fingers and the resilient material since any loads applied to the cushion substantially normal to the cushion surface are transferred laterally throughout the resilient material which is bonded to the underside of the finger-like elements. To take full advantage of this principle, a considerable depth of resilient material is provided below the finger-like elements 20 and 30 as shown in FIGURE 1.

The particular mounting arrangement of the applicants' invention, in which the bolster wire support means carrying the finger-like elements is mounted so that the front and rear sections of the wire support means may pivotally rotate about attachment means E, provides extraordinary softness in the front and rear portions of the unit. The front and rear softness is obtained by means of the ability of the front and rear sections to "give" or resiliently deflect upon the application of a load in that area because of the bolster wire support means' ability to rotate about mounting means E a predetermined distance. When the load is removed, the foamed resilient material effects a return of the fingers and bolster wire to their original position. The front section of the bolster wire support means could move about mounting means E until it had bottomed out against the frame suport means B. This designed distance of movement of the bolster wire support means upon application of load in the front section would normally be more than sufficient to support any loads on the front section of the unit. The rear section 8 of the bolster wire support means is longitudinally spaced from the rear section 4 of frame B and can move about the mounting means E against the underlying resilient material in the same manner as the front section 7 but in opposite rotational directions. In effect, the front and rear sections of the bolster wire support means and their attached finger means 20 and 30 are floating on the foam or resilient material between the wire support means C and the frame support means B. This "floating" action of the bolster wire support means and the attached finger-like elements provides an extraordinary feel of softness for this type of load supporting construction. The "floating" action of the wire support means of the invention provides a "lively" seat which returns or springs back to its unloaded condition almost instantly upon release of the load on the seat.

With the resilient material surrounding the frame support means and adhering to the finger-like load supporting and transfer means and the wire support means, maximum advantage is taken of the cooperation between each of these elements. Any load applied to the cushion is proportionately taken by the resilient material itself and by the finger-like elements and the bolster wire support means in cooperation with the resilient material, since the resilient material completely surrounds the frame support means B and is adhered to at least the lower portion of the flexible finger units 20 and 30 and the bolster wire support means C.

It has been found through extensive testing by thousands of cycles of load application and release to structures constructed according to this invention with the novel association of frame support means, bolster wire support means, and flexible load supporting and transferring apparatus and resilient material provides a load supporting structure with the durability required for application in a vehicle environment and yet is of minimum cost. Merely attaching the resilient material to a flexible load supporting member, such as the fingers illustrated, does not take advantage of the cooperation of resilient material and supporting members, which in itself as mentioned can provide an independent supporting means. Furthermore, merely attaching the resilient material to the support members and not to the under surface or extremity of the flexible members does not take full advantage of the finger units and resilient material so that such can cooperatively transfer loads to the support members.

Thus, surrounding the support members in a load supporting construction with a resilient material, and adhering or bonding such to the flexible members carried upon secondary support means which is hingedly connected near one end of the support members, takes full advantage of the resilient material, support members and flexible supporting means making up such construction. In regard to the resilient material disposed above the finger units and the spring support means, such can be merely placed upon the lower resilient material and held in place by the upholstery or covering around the cushion, or it may be molded in place so as to be integral with the resilient material disposed below the finger units.

The particular disposition of the flexible load supporting and transferring members with respect to the location of the area in which the load is to be applied to the load supporting construction is also of importance. The use of finger-like elements as the flexible load supporting and transferring structure in this environment, as well as any similar elongated member, presents an advantage in that such can be configured to place a major portion thereof in the area of greatest load application so that maximum advantage is taken of the cooperation between the resilent material bonded to the under surface or bottom side of such members and the members themselves. For example, finger-like elements as illustrated in FIGURES 2 and 3 may be of different lengths, widths or overall structural configuration to take maximum advantage of the cooperation between the resilient material underneath the finger-like members and the bolster wire spring support means and the members themselves.

The load supporting and transferring finger-like units 20 and 30 each have corresponding notches 22 and 32 in their lateral edges for receiving the rubber bands 25. The rubber bands 25 connect the adjacent ends of the opposing finger-like members 20 and 30 together in the areas of the cushion receiving the greatest load. Such rubber bands are extensible upon application of load to provide as mentioned the desired support in the area of the structure receiving the greatest load, and also provide additional resiliency and cooperation between the opposing and adjacent flexible finger-like members. The rubber bands 25 maintain the opposing and adjacent ends of the finger units in a same plane within the seat unit which, it has been found, promotes even distribution of any load upon the seat unit. The notches 22 and 32 may be of any desired shape or configuration. Provision of the notches in the lateral edges of the finger units has been found to be advantageous in the making of relatively thin seats. The rubber bands 25 are arranged to by parallel to the plane of the finger units in the center of the cushion unit, and do not present protrusions in the foamed resilient material.

Figure 6:
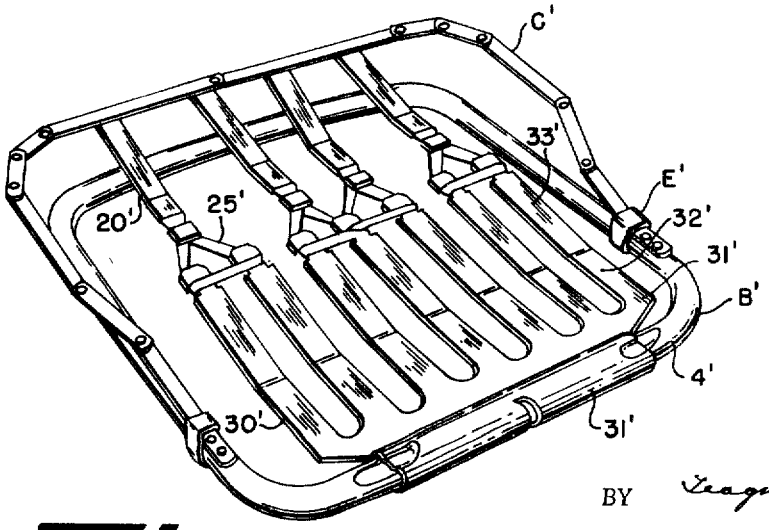
FIGURE 6 is a perspective view of a modified form of a load supporting structure of this invention.

In FIGURES 6 we have shown a modification of the load supporting and transferring structure and its particular attachment to the supporting means. This arrangement is identical with the seat assembly described except for certain differences which will be treated. In the arrangement shown the secondary support means C′ is made of flat steel stock; however, this support means could be made of any suitable material as spring steel wire for example. The spring support means C′ depicted in FIGURE 6 is hingedly mounted to the frame support means B′ at E′ in essentially the same manner as the assembly of FIGURES 1 through 5 previously described. However, the spring support means C′ depicted in FIGURE 6 does not have a rear supporting section corresponding to section 8 as is shown in FIGURES 2 and 3. In the arrangement of FIGURE 6, the load supporting and transferring finger-like elements 30′ have a common base portion 31′ secured, attached or otherwise carried in cantilevered relationship on the rear support section 4′ of the base support B′. The rear finger-like elements 30′ extend toward the opposing front finger-like element 20′ and the opposing elements are resiliently connected by means of rubber bands 25′ in a fashion similar to that of the assembly previously described. The rear finger-like elements 30′ have a portion 32′ offset from the plane of the frame support means B′ in a direction away from the top surface of the seat. The same rear finger elements 30′ have a section 33′ substantially parallel to the top surface of the seat and a major portion 34′ shaped to extend in substantially the same plane as the secondary support means C′. The seat assembly illustrated in FIGURE 6 has the same superior load supporting characteristics and extraordinary softness in the area of the front of the seat as previously described for the assembly of FIGURES 1 through 5.

While the invention has been described for particular use within the base portion of a seat, it is to be understood that the invention could be utilized in the back portion of a seat, as in the back portion 3 as illustrated in FIGURE 1.

It should be understood that the preferred embodiment of the present invention has been described herein in great detail, and that certain modifications and changes therein may be made by those skilled in the art to which it relates and it is intended to cover hereby all changes, adaptations and modifications falling within the scope of the appended claims.

Having described our invention, we claim:

1. Load supporting structure comprising:

frame means including a substantially rigid sub-frame and a bolster frame attached to the sub-frame, said bolster frame including a front portion spaced from said sub-frame and movable towards the sub-frame upon application of load, load transfer means supported solely at one end to said front portion of said bolster frame and extending longitudinally toward the rear of the frame means, and elastomeric material [bonded to and] surrounding said *bolster* frame [means] and [bonded to at least the underside of] said load transfer means *and bonded to at least a portion of said bolster frame and said load transfer means,* said elastomeric material, load transfer means and said bolster frame cooperatively transferring any load on said structure to said sub-frame.

2. A load supporting structure as set forth in claim 1 having load transfer means connected solely at one end to the rear portion of said frame means extending longitudinally toward the front of said frame means, said front and rear load transfer means terminating in longitudinal spaced relation to one another in the same plane.

3. A load supporting structure as set forth in claim 2 in which said rear load transfer means is connected at the rear of said frame means to said bolster frame.

4. A load supporting structure as set forth in claim 3 in which the rear of said bolster frame is spaced longitudinally from the corresponding rear of said sub-frame.

5. A load supporting structure as claimed in claim 2 in which said rear load transfer means is connected at the rear of said frame to said sub-frame.

6. A load supporting strutcure as set forth in claim 2 in which both of said front and rear load transfer means include a set of elements, the unsupported ends of which are interconnected by resilient means.

7. A load supporting structure as claimed in claim 1 in which said load transfer means includes a plurality of elements which extend into the area of greatest load.

8. A load supporting structure as set forth in claim 1 in which said bolster frame is inclined upwardly toward the front of said seat and connected near the rear of the sub-frame.

9. A load supporting structure as set forth in claim 1 in which the front portion of said bolster frame is disposed outwardly of the front portion of the sub-frame.

10. The load supporting structure as set forth in claim 1 wherein said bolster frame front portion is spaced from said sub-frame in a direction away from the loading surface of said structure.

11. The load supporting structure as set forth in claim 2 in which said front and rear load transfer means extend toward and terminate in spaced relation to one another in substantially the same plane as the bolster frame.

12. The load supporting structure as set forth in claim 11 wherein said load transfer means includes a plurality of elements.

13. The load supporting structure as set forth in claim 12 wherein said rear load transfer means has two of said elements opposing each of said elements of said front load transfer means.

14. Load supporting structure comprising:

first support means, second support means mounted on said first support means in cantilevered relationship and extending in an upwardly inclined plane from the first support means so that the major portion of said second support means is spaced from the plane of the first support means, load transfer means supported solely at one end to said second support means' major portion and extending therefrom, elastomeric material *surrounding said second support means and said load transfer means and* bonded to [said second support means and to the underside] *at least a portion* of said *second support means and said* load transfer means, said elastomeric material, load transfer means, and said second support means cooperatively transferring any load on said structure to said first support means.

15. The load supporting structure as set forth in claim 14 wherein:

the load transfer means includes a plurality of elements extending in laterally spaced relation with one another.

16. The load supporting structure as set forth in claim 14 in which said load transfer means includes portions in the same plane as said second support means mounted on opposite sides of said second support means and having an opening or interruption therebetween.

17. The load supporting structure as set forth in claim 15 in which the portions extend longitudinally in laterally spaced relationship to one another and terminate in longitudinal spaced relation to one another in the same plane.

18. The load supporting structure as set forth in claim 16 in which the rear of said second support means is longitudinally spaced from the corresponding frame of said first support means.

19. A load supporting structure as claimed in claim 15 having load transfer means connected solely at one end to the rear portion of said first support means and extending toward but terminating in longitudinal spaced relationship to said second support means and load transfer means.

20. Load supporting structure comprising:

first support means including front and rear sections disposed longitudinally in a plane normal to the direction of load on said load supporting structure, second support means mounted on said first support means by connection means so as to have a first portion extending from said connection means in an upwardly inclined plane toward the front section of said first support means, said second support means having a second portion in substantially the same plane as said first support means extending toward but terminating in spaced relationship from the rear portion of said first support means, load transfer means mounted on said second support means, said load transfer means supported solely at one end to said first portion of said second supporting means and extending toward the rear section of the first supporting means, elastomeric material *surrounding said second support means and said load transfer means and* bonded to [said second support means and to the underside] *at least a portion* of said *second support means and said* load transfer means, said elastomeric material, load transfer means and second support means cooperatively transferring any load on said structure to said first support means.

21. Load supporting structure as set forth in claim 20 in which said load transfer means includes a plurality of elements extending in laterally spaced relation with one another in the same plane as said second support means mounted on opposite sides of said second support means and having an opening or interruption therebetween.

*22. Load supporting structure comprising:*

*first support means,*

*second support means mounted on said first support means in cantilevered relationship so that the major portion of said second support means is spaced from the plane of said first support means,*

*load transfer means supported solely at one end to said second support means' major portion and extending therefrom,*

*elastomeric material surrounding said second support means and said load transfer means and bonded to said second support means and to at least a portion of said second support means and said load transfer means,*

*said elastomeric material, load transfer means and said second support means cooperatively transferring any load on said structure to said first support means.*

*23. The invention of claim 22 wherein said elastomeric material is bonded to at least the underside of said load transfer means.*

References Cited

The following references, cited by the Examiner, are of record in the patented file of this patent or the original patent.

UNITED STATES PATENTS

| | | | |
|---|---|---|---|
| 3,081,077 | 3/1963 | Sudman | 267—111 |
| 3,084,980 | 4/1963 | Lawson | 297—455 |
| 3,112,987 | 12/1963 | Griffiths | 264—45 |
| 3,140.086 | 7/1964 | Lawson | 267—111 |
| 3,208,085 | 9/1964 | Grimshaw | 5—345 |
| 3,235,245 | 2/1966 | Castelet | 267—103 |
| 3,252,735 | 5/1966 | Smith | 297—452 |
| 3,259,435 | 5/1966 | Jordan | 297—452 |
| 3,264,034 | 8/1966 | Lawson | 297—456 |
| 3,266,844 | 8/1966 | Amstutz | 297—457 |
| 3,363,943 | 1/1968 | Getz et al. | 297—458 |

CASMIR A. NUNBERG, Primary Examiner

U.S. Cl. X.R.

297—452